United States Patent
Potkonen (10) Patent No.: US 6,750,849 B2
(45) Date of Patent: Jun. 15, 2004

(54) METHOD AND ARRANGEMENT FOR ACCOMPLISHING A FUNCTION IN AN ELECTRONIC APPARATUS AND AN ELECTRONIC APPARATUS

(75) Inventor: Ari Potkonen, Jyväskylä (FI)

(73) Assignee: Nokia Mobile Phones, Ltd., Espoo (FI)

( * ) Notice: Subject to any disclaimer, the term of this patent is extended or adjusted under 35 U.S.C. 154(b) by 234 days.

(21) Appl. No.: 10/016,620

(22) Filed: Dec. 10, 2001

(65) Prior Publication Data
US 2002/0075239 A1 Jun. 20, 2002

(30) Foreign Application Priority Data
Dec. 15, 2000 (FI) .............................................. 20002752

(51) Int. Cl.⁷ ................................................. G09G 5/00
(52) U.S. Cl. .......................... 345/168; 345/173; 341/22
(58) Field of Search ............................. 345/168, 169, 345/173, 156, 158; 341/22, 23, 26

(56) References Cited

U.S. PATENT DOCUMENTS

| | | | |
|---|---|---|---|
| 6,218,967 B1 * | 4/2001 | Maula | 341/31 |
| 6,266,048 B1 * | 7/2001 | Carau, Sr. | 345/168 |
| 6,281,878 B1 * | 8/2001 | Montellese | 345/156 |
| 6,611,252 B1 * | 8/2003 | DuFaux | 345/168 |
| 6,614,422 B1 * | 9/2003 | Rafii et al. | 345/168 |
| 2002/0021287 A1 * | 2/2002 | Tomasi et al. | 345/168 |
| 2002/0075240 A1 * | 6/2002 | Lieberman et al. | 345/170 |
| 2003/0174125 A1 * | 9/2003 | Torunoglu et al. | 345/168 |

FOREIGN PATENT DOCUMENTS

| | | |
|---|---|---|
| EP | 0982676 A1 | 3/2000 |
| EP | 1039365 A2 | 9/2000 |
| WO | WO 00/21024 | 4/2000 |

* cited by examiner

*Primary Examiner*—Regina Liang
(74) *Attorney, Agent, or Firm*—Perman & Green, LLP (57) ABSTRACT

The invention relates to a method and arrangement for generating a virtual keyboard in connection with an electronic apparatus (10) on a planar surface (16). The virtual keyboard is drawn by a laser transmitter (11), and the light reflected from an obstacle (15b) in the area of the virtual keyboard is received. The angle of incidence and time of arrival of the received signal are observed, and on the basis thereof a conclusion is drawn about whether a certain key in the virtual keyboard has been pressed.

17 Claims, 6 Drawing Sheets

METHOD AND ARRANGEMENT FOR ACCOMPLISHING A FUNCTION IN AN ELECTRONIC APPARATUS AND AN ELECTRONIC APPARATUS

BACKGROUND OF THE INVENTION

1. Field of Invention

The invention relates to a method and an arrangement for accomplishing a function in an electronic apparatus housed within a body, which method comprises a step of drawing a virtual keyboard on a plane by means of radiation visible to the eye, a step of placing an obstacle in the keyboard pattern produced, a step of receiving radiation reflected from the obstacle, and a step of determining the position of the obstacle on the basis of the signal received. The invention further relates to a terminal employing the method as well as software means for implementing the method.

2. Brief Description of Related Developments

Various wireless devices, such as cellular phones and hand-held computers, need some kind of a physical user interface for data and command input. For example, it is known a small mobile phone keyboard with keys from 1 to 9, *, 0 and #, in addition to other possible letter characters produced by these keys. Likewise, it is known a cellular phone keyboard of a so-called "communicator" used in cellular networks with alphanumeric keys from a to z and from 1 to 0. These keyboards are made as small as possible so that they are relatively difficult to use in comparison with keyboards of normal computers.

Touch keyboards of various sizes for electric devices are also known. Such keyboards are usually arranged in the form of a touchscreen on the device's display. In such an arrangement, arrays of LED transmitters and receivers, for example, are placed in the frame around the screen, on more than one side of the screen. When a finger or some other obstacle is pointed at a position on the screen, a beam of infrared light is cut off, resulting in some predetermined function.

Patent application FI 990676 further discloses a method in which there is generated, by means of a plurality of infrared transceiver units, an artificial, virtual, two-dimensional keyboard arrangement on one side of an apparatus. In the close vicinity of the apparatus there is thus created a data input area, a kind of two-dimensional virtual keyboard in the X-Y plane. According to the said application, an image of the virtual keyboard can be advantageously projected on an even surface by means of a laser diode and refractive optics. The said surface on which the virtual keyboard is generated is usually the surface of a table. The exact position of an obstacle/pointer or finger on the plane determined by the virtual keyboard is detected by means of the infrared transmitters and receivers. The exact position of the obstacle on the virtual keyboard detected by the device disclosed corresponds to the execution of a certain function or to the pressing of a key on a real keyboard.

The problem with this arrangement is, however, that the received signal has a very nonlinear nature because it is reflected from an indefinite obstacle. In addition, randomly varying infrared radiation is received from the surroundings, adding to the noisiness of the received signal. Therefore, the amplitude and phase characteristics of the signal reflected/returned back to the receiver vary a great deal not just on the basis of the position of the obstacle. Thus, various tabulated correction coefficients, which have been obtained by experimentation, have to be used to calculate the position of the obstacle. Therefore, the computational processing of the received signal is difficult and requires large computing capacity in order to calculate the position of the obstacle at the desired accuracy from the received signal. In this case problems will be caused by the computing capacity of the processor and the size of the memory needed in the calculation in a cellular phone, for example. Moreover, if the position of the obstacle is to be determined in a third dimension as well (X, Y, and Z dimensions), the calculation will require very much computing capacity and memory, and to realize such a solution by conventional DSP techniques in a small handheld device is difficult.

An object of this invention is to provide a new kind of virtual keyboard which requires less computing capacity than a virtual keyboard according to the prior art.

SUMMARY OF THE INVENTION

The objects of the invention are achieved by a virtual keyboard where a keyboard pattern is drawn on a planar surface by at least one laser transmitter, and a signal potentially reflected from a finger or other obstacle is observed by at least one receiver, which signal may be interpreted as a press of a virtual key.

The method according to the invention for accomplishing a function is characterized in that the source of radiation visible to the eye for producing a virtual keyboard comprises at least one laser transmitter emitting a beam of light which both draws the desired key pattern and observes the position of an obstacle in the key pattern.

An arrangement for utilizing the method according to the invention is characterized in that the arrangement comprises a laser transmitter for drawing a virtual keyboard and observing the position of an obstacle, and a receiver for receiving radiation/light reflected from an obstacle in the virtual keyboard.

A terminal according to the invention is characterized in that the means for producing a virtual keyboard and observing an obstacle in the virtual keyboard comprises a laser transmitter and a receiver for receiving radiation/light reflected from an obstacle and a drawing control unit.

A software means according to the invention is characterized in that the software means comprises a step for determining the reception angle and reception time of a received signal, a step for verifying the validity of the reception angle, a step for verifying the validity of the reception time, a step for counting the successive reflection signals received at the different sweeps and for estimating whether a sufficient number of reflections have been received, and a step for determining that a key in the virtual keyboard has been pressed.

Advantageous embodiments of the invention are specified in the dependent claims.

The basic idea of the invention is as follows: An electronic apparatus comprises at least one laser transmitter and a receiver sensitive to light/radiation reflected from an object. A coherent beam of light from the laser transmitter is periodically deflected within an area of a desired size by means of a mirror arrangement integrated in the electronic apparatus. The movement and intensity of the laser beam are controlled so that it draws on a flat surface a virtual keyboard of a desired shape complete with figures and characters. A virtual key is considered pressed when a receiver in the electronic apparatus receives a signal reflected at a certain angle within a predetermined transit time window.

An advantage of the invention is that the drawing of the virtual keyboard and the observation of a press of a key can be realized using a single phase-coherent source of light.

Another advantage of the invention is that the virtual keyboard can be drawn using other than infrared light.

A further advantage of the invention is that the electronic apparatus requires less data processing capacity than a solution based on several transmitter-receivers operating in the infrared region.

BRIEF DESCRIPTION OF THE DRAWINGS

The invention is below described in detail. Reference is made to the accompanying drawings in which.

DETAIL DESCRIPTION OF THE PREFERRED EMBODIMENTS

Figure 1A:
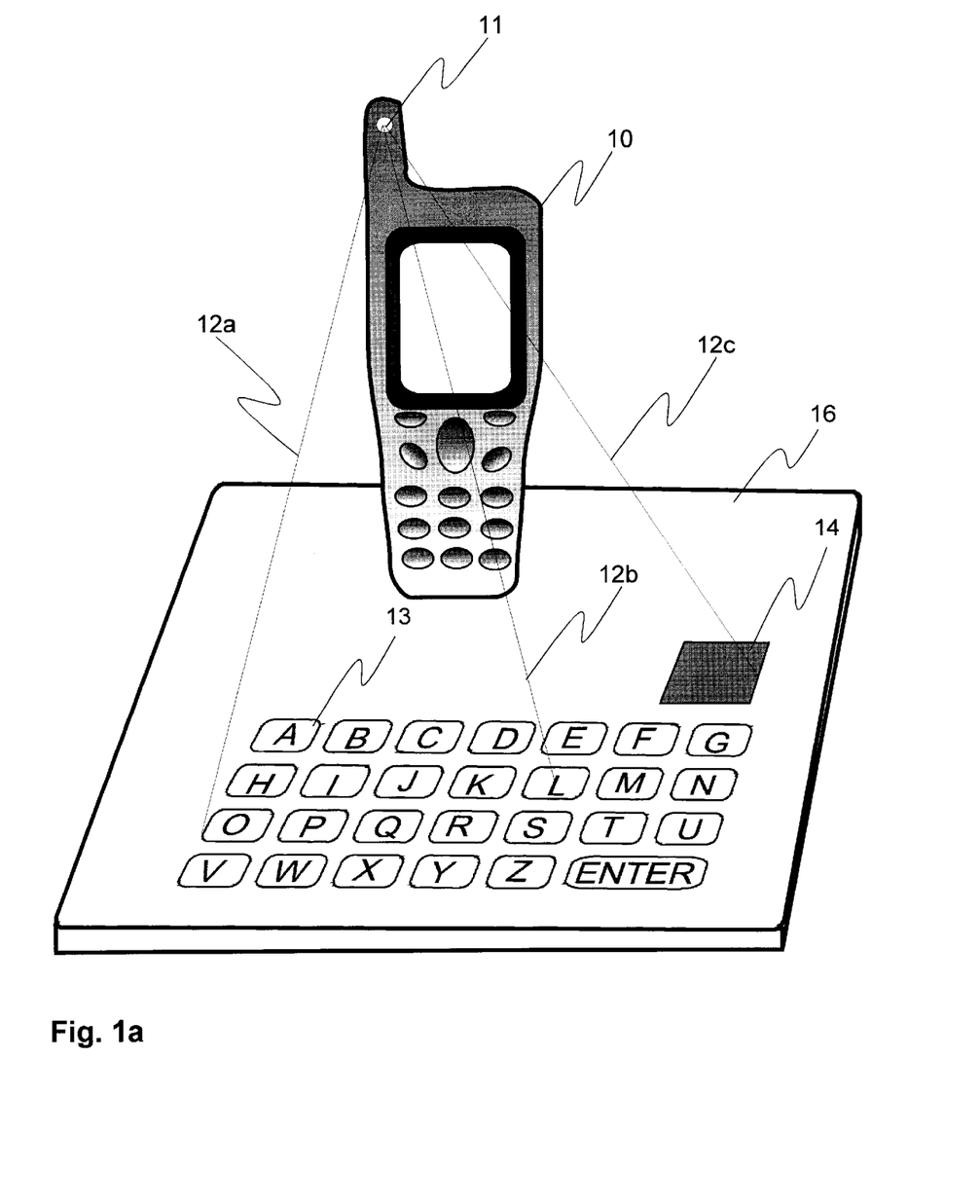
FIG. 1a shows an example of a virtual keyboard according to the invention on a planar surface.

FIG. 1a shows an example of a hardware arrangement utilizing a virtual keyboard according to the invention. The virtual keyboard according to the invention is generated on a planar surface 16 which advantageously is on a substantially horizontal plane. On the planar surface 16 an electronic apparatus 10 is placed so that it stays in its place with respect to the surface 16 when the virtual keyboard is being used. The electronic apparatus may be any apparatus the size of which is so small that it is difficult to fit in it all the keys needed in the user interface or the keys are difficult to use because of their small size. One such apparatus is e.g. a modern compact cellular phone.

The virtual keyboard is drawn on the plane 16 advantageously by a laser transmitter 11 in the electronic apparatus 10. A coherent beam of radiation/light is controlled by a mirror system so that the desired patterns can be drawn on the surface of the plane 16. The key arrangement with the alphabetical characters shown in FIG. 1a is naturally an example only. A laser beam draws the outlines of the keys 13, beam 12a, key identifiers, beam 12b, and other possible function keys, beam 12c, such as the zone 14 shown in FIG. 1a simulating the operation of a so-called roller mouse. Various other function keys needed in the operation and control of the electronic apparatus, such as e.g. mouse or navigation keys, are advantageously drawn in the same manner. A laser beam scans the whole virtual keyboard area advantageously at least fifty times a second. This way, an image is produced which does not appear flickering in the human eye and will not strain the eyesight.

Since a laser beam may cause harm to the eye when it is directed thereto, the hardware arrangement according to the invention is such that the laser transmitter operates only when it is placed in its operating position on a surface substantially in the horizontal plane. When an apparatus according to the invention is brought into operating condition its first action is to scan once over the area the apparatus presumes to belong to the virtual keyboard to be generated. If the angle between the electronic apparatus and the surface 16 is correct, small part of the emitted laser beam returns to the electronic apparatus as reflections. These reflections are received by a separate receiver which in the exemplary case depicted in FIG. 1a is located in the same place as the laser transmitter 11. If the reflected beams return in valid time windows and at valid angles from the whole area of the virtual keyboard the electronic apparatus assumes that it and the virtual keyboard are situated in the right position on a planar surface 16 where there are no other significant obstacles. If, however, reflections arrive in a wrong time window or at a wrong angle of observation the laser transmitter is turned off as it is presumable that the apparatus is either at an incorrect angle relative to the plane 16 or that there is an unidentified obstacle in the area of the virtual keyboard. Only when the procedure described above has been successfully accomplished will the virtual keyboard proper be drawn on the plane 16. Furthermore, also during the use of the virtual keyboard proper it is regularly checked that the both sides of the virtual keyboard and the edge closest to the electronic apparatus produce the correct reflections. If deviations are found the laser transmitter is turned off.

Figure 1B:
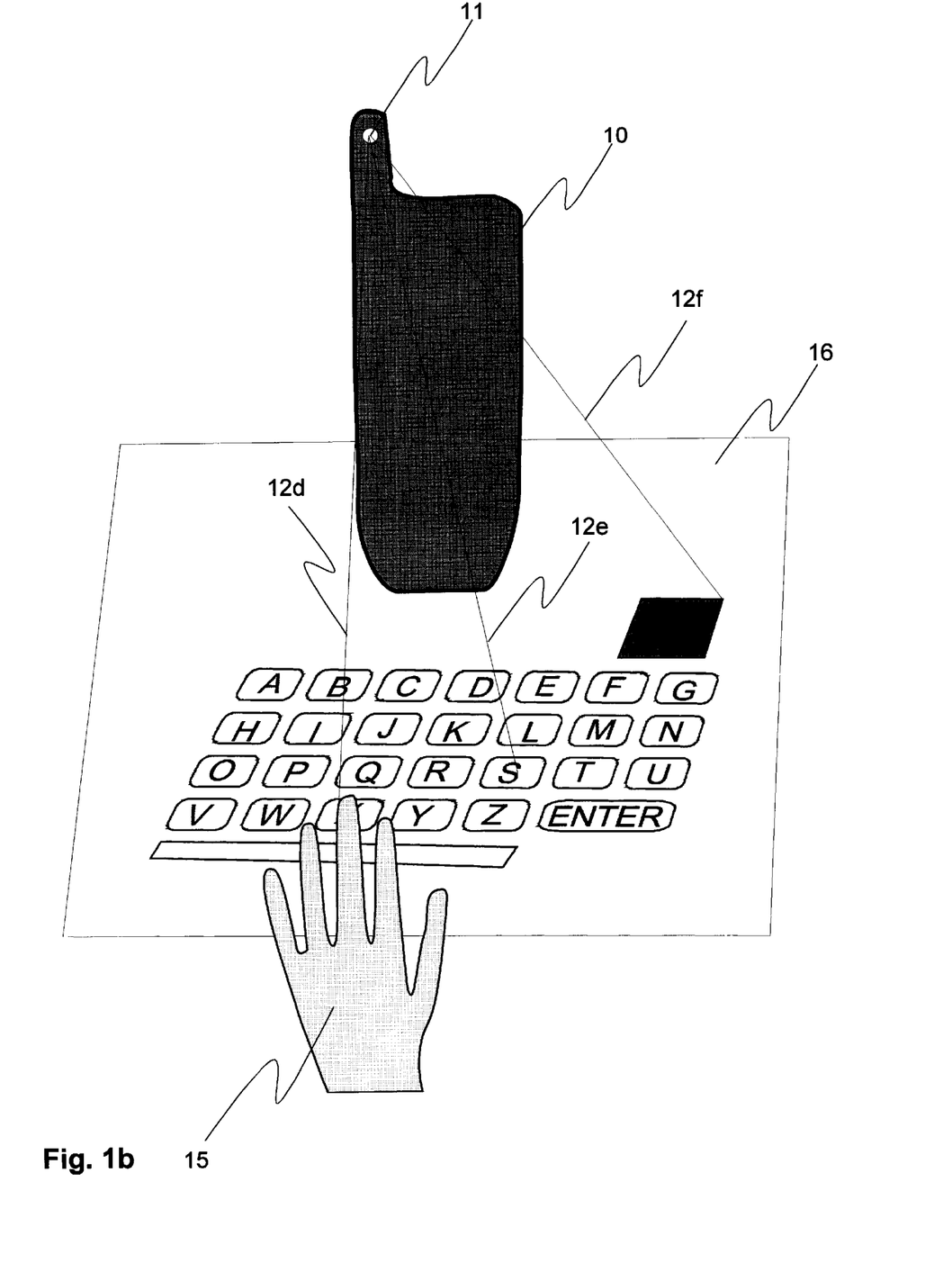
FIG. 1b shows by way of example the drawing of a virtual keyboard with an obstacle in its effective area.

FIG. 1b shows by way of example a situation in which a key in the virtual keyboard is pressed by a finger belonging to a hand 15. FIG. 1b shows by way of example three laser beams 12d, 12e and 12f depicting the drawing of the virtual keyboard at certain moments of time. Beam 12d hits the exterior of a finger of the hand 15. This results in a strong reflection back towards the electronic apparatus 10. If the angle of the return beam is in the allowed range and the return time of the beam is in the correct time window the logic in the electronic apparatus interprets that a certain key has been pressed and advantageously sounds a tone. If the return time of the beam does not coincide with the correct time window the electronic apparatus will interpret that an obstacle is indeed in the way of the beam but, however, above the level of the keyboard. In that case the electronic apparatus will not conclude that a key in the virtual keyboard has been pressed.

Figure 1C:
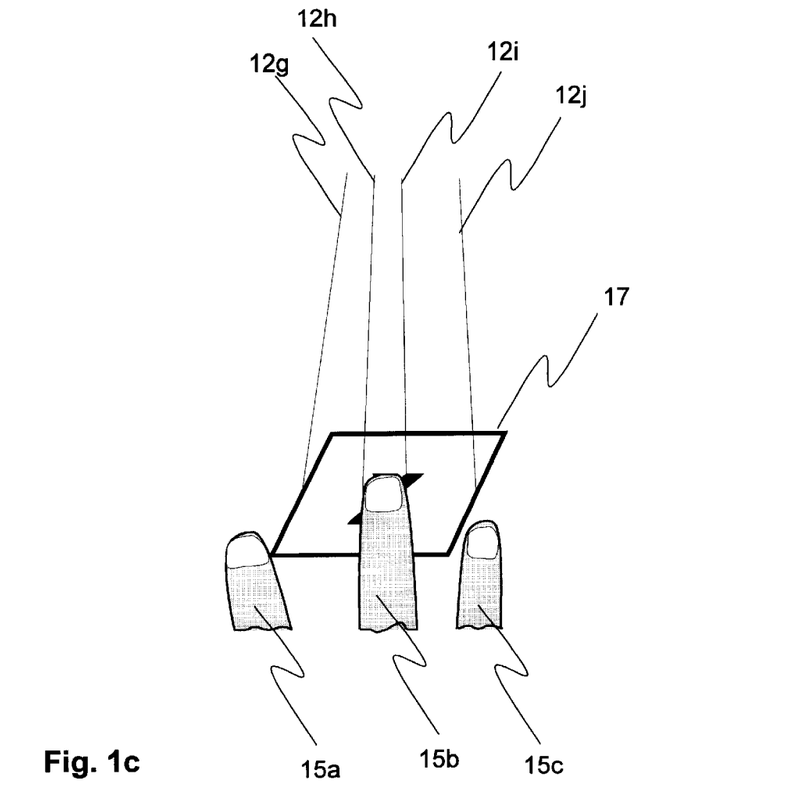
FIG. 1c shows by way of example how the drawing of the virtual keyboard is controlled when an obstacle is located in the area of the virtual keyboard.

As it is preferable that the laser beam will not draw on the hand of the user the hardware arrangement and method according to the invention apply a procedure according to FIG. 1c. FIG. 1c depicts the pressing of the "X" key 17 by a finger 15b. The other fingers 15a and 15c shown in the figure do not take part in the pressing of the "X" key. The figure shows four laser beams 12g, 12h, 12i and 12j. Beam 12g draws part of the left border of the virtual "X" key. When the laser beam has been deflected more to the right in the plane of the figure, beam 12h will hit the left side of the finger 15b. This results in a strong reflection back towards the electronic apparatus. The electronic apparatus observes that a reflection has arrived and considerably decreases the power of the laser transmitter so that there is no risk of damage to the finger. The laser transmitter operates at the reduced power up to beam 12i. Therebetween, sufficiently light is reflected back from the finger so that the electronic apparatus can interpret that the finger still continues. However, as the reflection of beam 12i clearly deviates from the preceding reflection the electronic apparatus concludes that the obstacle/finger has come to an end and restores the transmission power of the laser transmitter back to original so that it draws, using beam 12j, the normal right border of the "X" key.

The electronic apparatus stores in its memory all the deviating reflection positions so that in the next scan it may already in advance reduce or completely cut off the power of the laser transmitter at these character positions. Reduced drawing power is used in cases where the received reflection is interpreted so as to have been generated in conjunction with a press of a virtual key. The drawing power is completely cut off advantageously in a situation where the reflection is interpreted to have been received from above the limit of an acceptable key press. In such a case drawing may be canceled altogether for a next few scans at the points in question without degrading the performance of the system.

When the finger is removed from the "X" key, it no longer causes a reflection which the electronic apparatus could receive. Therefore, the power of the laser transmitter for the position where the finger was, is gradually restored to the original value during the next few scans following the removal of the finger. In the method according to the invention it is also possible to set desired limit values for the width of a finger so that the electronic apparatus will regard an obstacle within the said limit values as a finger. Obstacles thinner or thicker than the limit values are interpreted as something else than action representing the pressing of a key. Moreover, it is possible to set a condition for a key press specifying that a desired number of successive laser beam scans indicates that an obstacle/finger is placed on a certain virtual key.

Figure 1D:
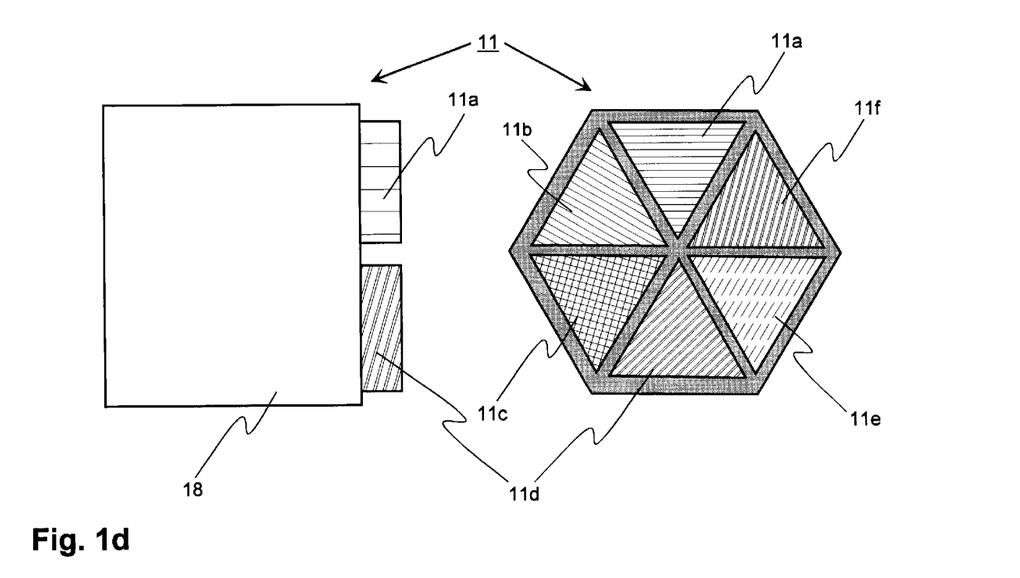
FIG. 1d shows an example of a laser transmitter according to the invention.

The method according to the invention may naturally employ separate laser transmitters to draw the keyboard proper and to detect a key press. Likewise, the laser transmitter and receiver may be located in different places in the electronic apparatus. FIG. 1d shows by way of example a possible laser transmitter 11. In the explanatory embodiment depicted in FIG. 1d the laser transmitter's 11 laser beam control system is located inside a housing 18. In the explanatory embodiment depicted in FIG. 1d the laser transmitter 11 comprises all in all six separate laser transmitters that differ from each other by the color of the light they emit: red 11a, violet 11b, blue 11c, green 11d, yellow 11e and orange 11f. The virtual keyboard may be drawn using any individual laser transmitter or two or more laser transmitters simultaneously. Similarly, the virtual keyboard may be drawn by one laser transmitter and the possible recognition of a press of a virtual key may be carried out by another laser transmitter.

Figure 2:
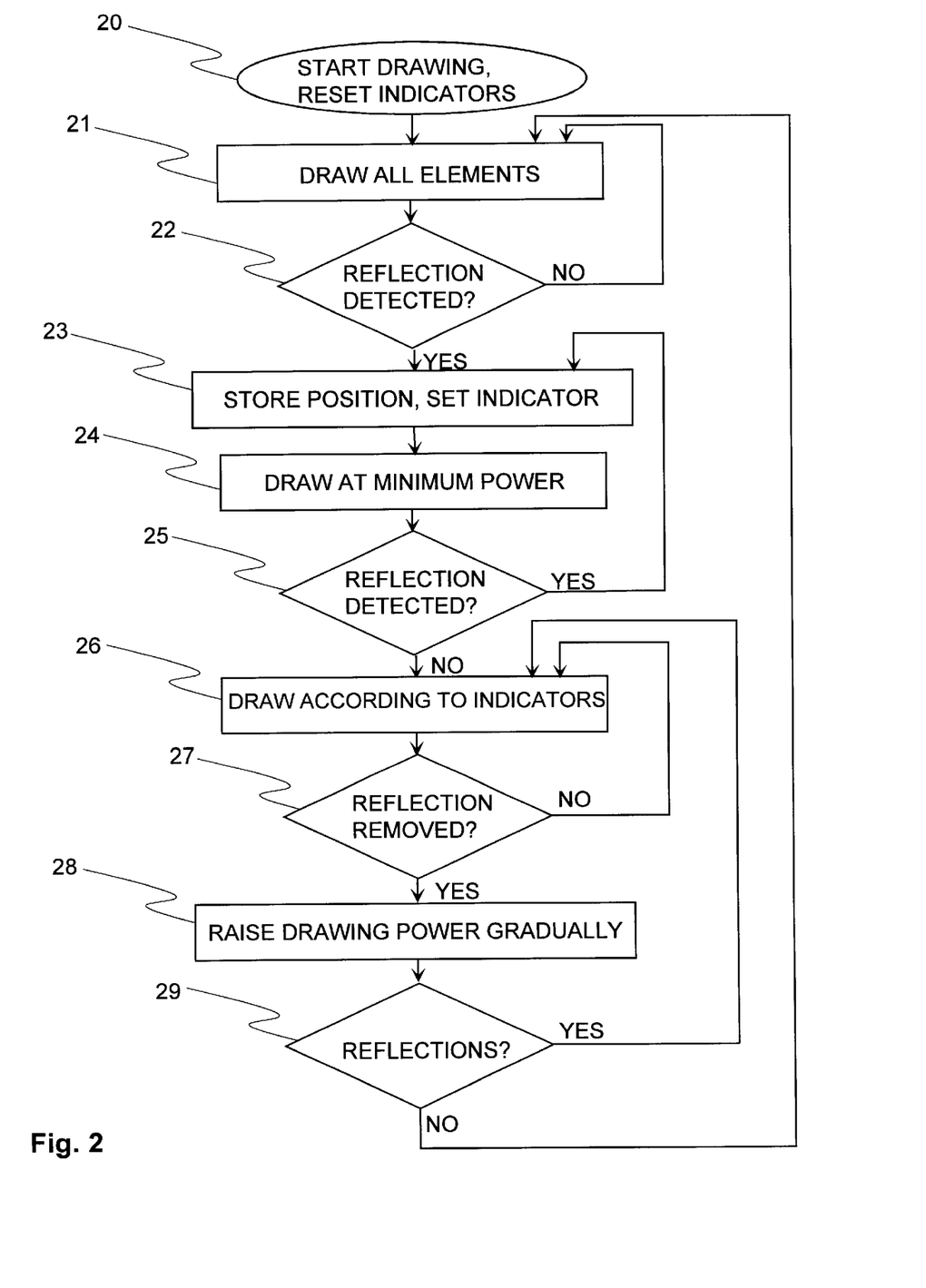
FIG. 2 shows an exemplary flow diagram describing how in the hardware arrangement according to the invention the laser beam is prevented from drawing on the hand of the user.

FIG. 2 shows in the form of an explanatory flow diagram the steps of the virtual keyboard drawing procedure described above. It does not, however, show the step in which the electronic apparatus checks that it is in the correct position relative to the surface in question. The actual drawing of the virtual keyboard is started in step 20. In the preceding step the area of the virtual keyboard was scanned once and it was verified that there are no obstacles preventing operation. Therefore, the indicators needed in the drawing of the virtual keyboard are "reset". By indicators it is in this context meant those points in the virtual keyboard area which have produced/produce reflections, i.e. there is an obstacle in the way of the transmitted laser beam. Since no such obstacles were detected in the initial situation 20, all elements in the virtual keyboard are drawn at full drawing power on the surface of the plane 16 in step 21.

The returning light is however continually observed in step 22. If no strong reflection is observed, the drawing of all elements at the original drawing power continues. If, however, a strong reflection is observed in step 22, the process moves on to step 23. In step 23 the location in question is stored in the memory of the electronic apparatus, i.e. an indicator is set. The setting of an indicator results in step 24 in which the power of the laser transmitter is reduced. In some special cases where the reflection clearly comes from above the plane of the keyboard the drawing is advantageously canceled altogether for a few scanning rounds. If reduced drawing power is used, the presence of an obstacle will result in a reflection which can be registered by the receiver in the apparatus. However, the reduced drawing power used here is not harmful, say, to the human skin. In step 25 it is checked whether the next point still produces a reflection caused by an object. If so, the position is stored in memory and an indicator is set for this position, too, and the position is also drawn at reduced drawing power.

However, the reflections will come to an end at some stage as the laser beam is further deflected. When this situation is detected in step 25 the process moves on to step 26. In step 26 the virtual keyboard is drawn controlled by the indicators stored in the memory of the electronic apparatus. In other words, at positions where indicators are set, the drawing power of the transmitter is decreased or it is automatically cut off completely in the next scan. The rest of the virtual keyboard is still drawn at the original drawing power. However, at each drawing scan a separate test is carried out at the indicator locations, step 27. If the test 27 reveals that the obstacle is still there, drawing is continued at reduced power for the next scan, too, according to the indicator in question. If, however, the test 27 reveals that the obstacle has been removed, the process moves on to step 28. In step 28, transmission power is gradually raised towards the full drawing power at the positions corresponding to the removed indicators. The increase of drawing power is followed by a test 29 in which it is checked whether there are still indicators set in the memory of the electronic apparatus. If there are still indicators set, drawing continues in step 26. In other words, valid indicators are still taken into account. If, however, it is found in step 29 that no indicators are set in the memory of the electronic apparatus, the process returns to step 21 in which all the elements of the virtual keyboard are drawn at full drawing power.

Figure 3:
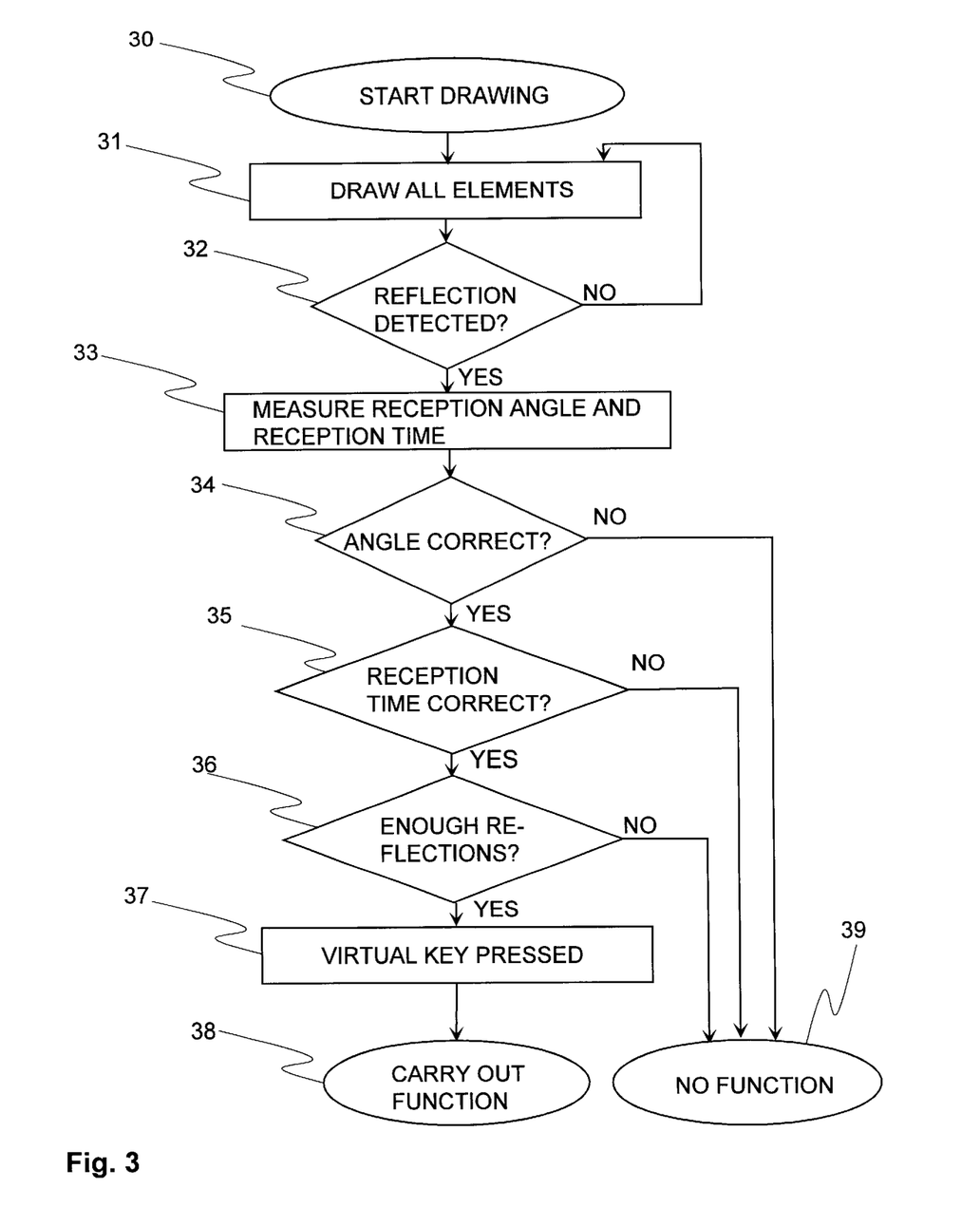
FIG. 3 shows an exemplary flow diagram describing how a virtual key is interpreted pressed.

FIG. 3 shows in the form of an explanatory flow diagram how a hardware arrangement according to the invention concludes that a virtual key has been pressed. The drawing of the virtual keyboard is started in step 30. In step 31 all elements in the virtual keyboard are drawn at full drawing power. In step 32 it is checked whether reflections are detected in the area of the virtual keyboard. If no reflections are detected, drawing of the virtual keyboard is continued according to step 31. If a reflection is detected in step 32, the power of the drawing beam is first reduced as illustrated in FIG. 2. The reception angle and reception time of the reflection are measured in step 33. In step 34 it is tested whether the reception angle is valid. If not, the process moves on to step 39 in which no function is allowed to be carried out. If the reception angle is correct, it is tested in step 35 whether the reception time is within the predetermined time window. If not, the process again ends up in step 39 in which functions cannot be carried out. If the reception time is within the allowed range, the process moves on to step 36. In step 36 it is checked whether a sufficient number of successive scans produced the same result. If not, the process again ends up in step 39. If, however, a sufficient number of successive scans produce the same allowed result, the process moves on to step 37 in which it is detected that a certain key in the virtual keyboard was pressed, and in step 38 the said function is carried out.

Figure 4:
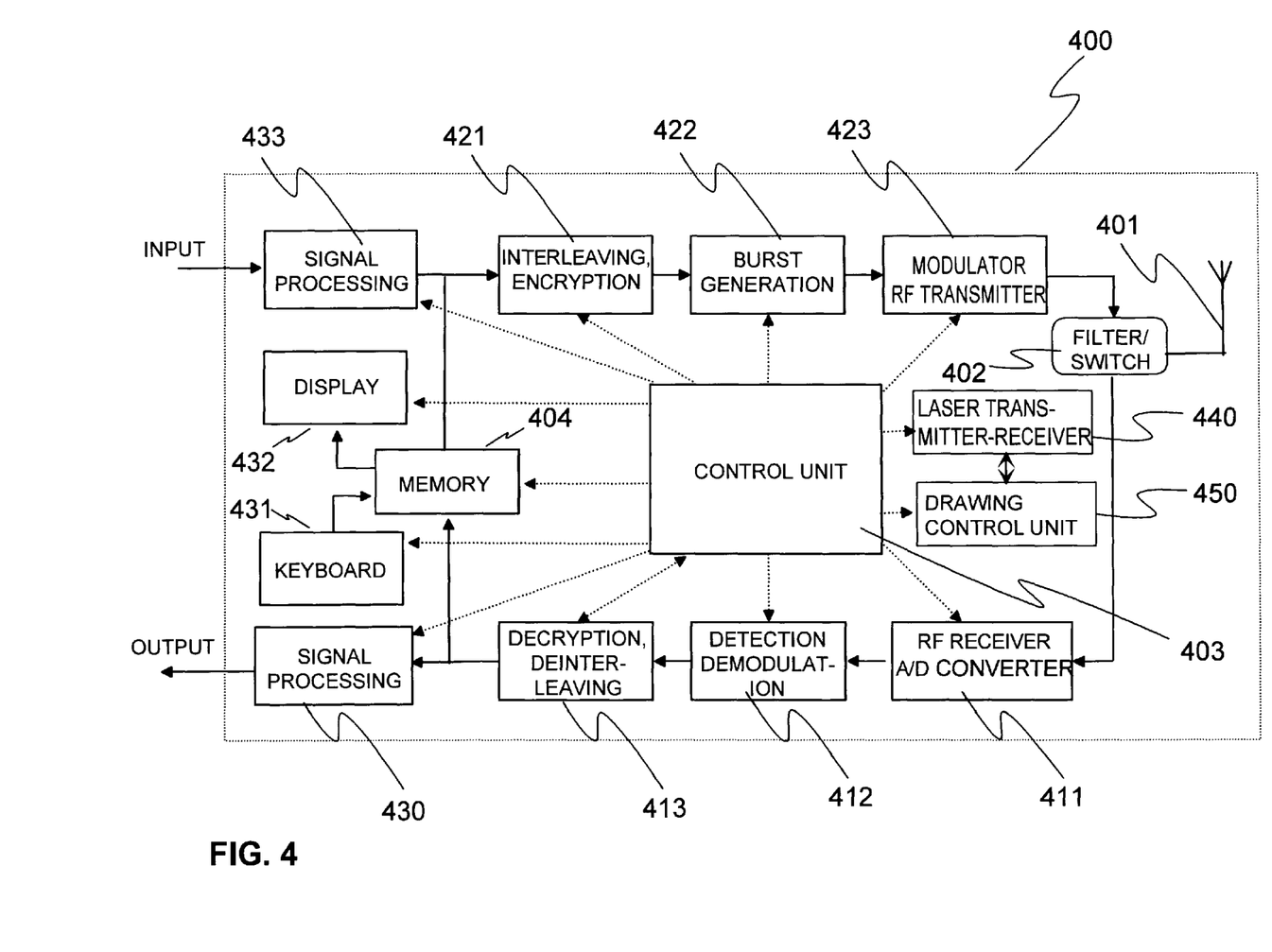
FIG. 4 shows a cellular radio system terminal applying a virtual keyboard according to the invention.

FIG. 4 shows in the form of a simplified block diagram a cellular terminal 400 which may utilize a virtual keyboard according to the invention. The terminal comprises an antenna 401 to receive radio-frequency, or RF, signals transmitted by base stations. A received RF signal is conducted by a switch 402 to a RF receiver 411 where the signal is amplified and converted digital. The signal is then detected and demodulated in block 412. Block 413 performs deciphering and deinterleaving. Signal processing is then performed in block 430. The received data may be saved as such in the terminal's memory 404 or alternatively the processed packet data are transferred after signal processing to a possible external device such as a computer. A control unit 403 controls the aforementioned receiving blocks in accordance with a program stored in the unit.

Transmission from a mobile station is carried out e.g. as follows. Controlled by the control unit 403, block 433 performs possible signal processing on the data, and block 421 performs the interleaving and ciphering on the processed signal to be transmitted. Bursts are generated from the encoded data in block 422 which are modulated and amplified into a transmission RF signal, block 423. The RF signal to be transmitted is conducted to an antenna 401 via switch 402. Also the aforementioned processing and transmission functions are controlled by a control unit 403.

The terminal may advantageously comprise a display device 432 and keyboard 431 attached to the body of the electronic apparatus. However, these can be replaced by the virtual keyboard according to the invention when a bigger display or keyboard is desired.

In the terminal depicted in FIG. 4 the components essential from the point of view of the invention include the prior-art control unit 403 and terminal's memory 404. In addition, the terminal must include at least one laser transmitter according to the invention and a receiver unit 440 and a drawing control unit 450 to produce a virtual keyboard. The drawing control unit 450 advantageously controls the operation and use of the virtual keyboard according to the invention. Advantageously the drawing control unit comprises a central processing unit and memory of its own. If necessary, part of the memory 404 of the terminal may also be allocated for the generation of the position and indicator records needed in the operation of the virtual keyboard according to the invention. Naturally, it is possible to use some other memory means in association with and detachable from the terminal, such as the SIM card which is known as such.

Advantageous embodiments of the invention were described above. The invention is not limited to the solutions just described. The inventional idea may be applied in numerous ways within the limits defined by the claims attached hereto.

What is claimed is:

1. A method for accomplishing a function in an electronic apparatus housed within a body, which method comprises:
   drawing a virtual keyboard on a plane by means of radiation visible to the eye,
   where the source of radiation visible to the eye comprises at least one laser transmitter emitting a beam of light which both draws the desired key pattern observes the position of an obstacle in the key pattern,
   placing an obstacle in the keyboard pattern produced, receiving radiation reflected from the obstacle, determining the position of the obstacle on the basis of the signal received, and
   after receiving a signal reflected from an obstacle, reducing the drawing power of the laser transmitter for as long a time as the signal reflected from the obstacle can be received.

2. A method according to claim 1 wherein the same laser transmitter is used in the drawing of the virtual keyboard and in the recognition of the position of an obstacle.

3. A method according to claim 1 wherein to determine the position of the obstacle the angle of incidence and the reception time of the received reflected signal are measured, and if they are within a predetermined limit value range and if a sufficient number of successive drawing scans produce a reflection, it is concluded that a virtual key has been pressed.

4. A method according to claim 1 which further comprises a step in which the signal reflected obstacle is stored as an indicator in the memory of the electronic apparatus.

5. A method according to claim 4 which further comprises a step in which the power of the laser transmitter is always reduced at positions according to the indicators stored in the memory of the electronic apparatus when the virtual keyboard is drawn the next time.

6. A method according to claim 1 which further comprises a step for gradually raising the drawing power in the next drawing rounds back to the original drawing power after it is detected that the reflection has been removed.

7. An arrangement for accomplishing a function in an electronic apparatus housed within a main body, which arrangement comprises a means for generating and using a virtual keyboard produced on a planar input area outside the main body of the apparatus, where the means comprises a laser transmitter for drawing a virtual keyboard and observing the position of an obstacle, and a receiver for receiving radiation/light reflected from an obstacle in the virtual keyboard, which comprises at least one row of virtual keys, means for determining the position of the obstacle in the virtual keyboard on the basis of the reflected radiation/light; and means for reducing the drawing power of the laser transmitter after receiving the reflected radiation/light for as long a time as the reflected radiation/light is received from the obstacle.

8. An arrangement according to claim 7 which further comprises a means for determining the reception angle and reception time of radiation/light reflected from an obstacle.

9. An arrangement according to claim 8 which further comprises a means for comparing the reception angle, reception time and the number of successive drawing scans that produced reflections, with predetermined limit values in order to recognize the operation of a virtual key.

10. An arrangement according to claim 7 wherein the drawing of the virtual keyboard and observation of the position of an obstacle are carried out by separate laser transmitters.

11. An arrangement according to claim 7 which further comprises a means for preventing the operation of a laser transmitter in the electronic apparatus if the position of the electronic apparatus relative to the plane used as a drawing platform is not within the allowed range of limit values.

12. An arrangement according to claim 7 which further comprises a means for reducing the power of the laser transmitter when a reflection has been received from the radiation field of the laser transmitter.

13. A cellular network terminal, comprising:
   means for receiving signals,
   means for transmitting signals,
   means for controlling the operation of the terminal,
   memory for scoring programs, and
   means for producing a virtual keyboard and observing an obstacle in the virtual keyboard, said means comprising a laser transmitter and a receiver for receiving radiation/light reflected from an obstacle and a drawing control unit, means for determining the position of the obstacle in the virtual keyboard on the basis of the reflected radiation/light; and means for reducing the drawing power of the laser transmitter after receiving the reflected radiation/light for as long a time as the reflected radiation/light is received from the obstacle.

14. A terminal according to claim 13 therein the means for observing the position of an obstacle in the virtual keyboard comprises means for determining the reception angle and reception time of a received signal, means for determining the validity of the reception angle, means for determining the validity of the reception time, means for counting the successive reflection signals received at different scanning rounds and for estimating whether a sufficient number of reflections have been received, and means for detecting a press of a key in the virtual keyboard.

15. A terminal according to claim 14 wherein the means for observing the position of an obstacle in the virtual keyboard further comprises a portion allocated from the memory of a drawing control unit connected to the terminal for storing indicators caused by reflected signals for the next scanning round.

16. A computer program product comprising:

a computer useable medium baying computer readable code means embodied therein for causing a computer to recognize the position of an obstacle in the area of a virtual keyboard of an electronic apparatus, the computer readable code means in the computer program product comprising:

computer readable program code means for causing a computer to determine the reception angle and reception time of a received signal, computer readable program code means for causing a computer to determine the validity of the reception angle, computer readable program code means for causing a computer to determine the validity of the reception time, computer readable program code means for causing a computer to count the successive reflection signals received at different scanning rounds and estimate whether a sufficient number of reflections have been received, and computer readable program code means for causing a computer to detect a press of a key in the virtual keyboard by determining the position of the obstacle on the basis or the reflection signals; and computer readable program code means for causing a computer to reduce a drawing power of a laser transmitter that emits a beam of a light which both draws a desired key pattern and observes the position of the obstacle in the key pattern for as long a time as reflections are received from the obstacle.

17. An article of manufacture comprising:

a computer useable medium having computer readable code means embodied therein for causing a computer to recognize the position of an obstacle in the area of a virtual keyboard of an electronic apparatus, in the article of manufacture comprising:

computer readable program code means for causing a computer to determine the reception angle and reception time of a received signal, computer readable program code means for causing a computer to determine the validity of the reception angle, computer readable program code means for causing a computer to determine the validity of the reception time, computer readable program code means for causing a computer to count the successive reflection signals received at different scanning rounds and estimate whether a sufficient number of reflections have been received, and computer readable program code means for causing a computer to detect a press of a key in the virtual keyboard by determining the position of the obstacle on the basis of the reflection signals; and computer readable program code means for causing a computer to reduce a drawing power of a laser transmitter that emits a beam of light which both draws a desired key pattern and observes the position of the obstacle in the key pattern for as long a time as reflections are received from the obstacle.

* * * * *

UNITED STATES PATENT AND TRADEMARK OFFICE
CERTIFICATE OF CORRECTION

PATENT NO.    : 6,750,849 B2
DATED         : June 15, 2004
INVENTOR(S)   : Ari Potkonen It is certified that error appears in the above-identified patent and that said Letters Patent is hereby corrected as shown below:

Column 7,
Line 57, "pattern observes" should be -- pattern and observes --

Column 8,
Line 12, "the signal" should be -- the position of the signal --
Line 12, "reflected obstacle" should be -- reflected from an obstacle --
Line 64, "scoring" should be -- storing --

Column 9,
Line 8, "therein" should be -- wherein --
Line 29, "baying" should be -- having --

Signed and Sealed this

Twenty-eighth Day of September, 2004

JON W. DUDAS
*Director of the United States Patent and Trademark Office*